United States Patent [19]
Mod et al.

[11] 3,872,120
[45] Mar. 18, 1975

[54] PROCESS FOR THE PREPARATION OF 1,3-DIALKANOYL HEXAHYDROPYRIMIDINE

[75] Inventors: Robert R. Mod; Frank C. Magne; Gene Sumrell, all of New Orleans; Arthur F. Novak, Baton Rouge, all of La.; James M. Solar, Lubbock, Tex.

[73] Assignee: The United States of America as represented by the Secretary of Agriculture, Washington, D.C.

[22] Filed: Mar. 4, 1974

[21] Appl. No.: 448,426

Related U.S. Application Data

[62] Division of Ser. No. 154,698, June 18, 1971, abandoned.

[52] U.S. Cl.......... 260/251 R, 260/309.7, 424/251, 424/273
[51] Int. Cl. ..................... C07d 57/28, C07d 57/30
[58] Field of Search ................................ 260/251 R

[56] References Cited
OTHER PUBLICATIONS
"Chemical Abstracts" Vol. 74 (1971) par. 125.618(s), Page 470.

*Primary Examiner*—Elbert L. Roberts
*Attorney, Agent, or Firm*—M. Howard Silverstein; Max D. Hensley

[57] ABSTRACT

1,3-Diacyl imidazolidines and hexahydropyrimidines were prepared by the reaction of formaldehyde and an N,N'-alkylenebisamide in the presence of a strong acid catalyst, the substituent acyl groups being acetyl, butyryl, pentanoyl, hexanoyl, heptanoyl, octanoyl, nonanoyl, decanoyl, palmitoyl, stearoyl, and oleoyl. These compounds exhibit antimycotic activity.

2 Claims, No Drawings

PROCESS FOR THE PREPARATION OF 1,3-DIALKANOYL HEXAHYDROPYRIMIDINE

A non-exclusive, irrevocable, royalty-free license in the invention herein described, throughout the world for all purposes of the United States Government, with the power to grant sublicenses for such purposes, is hereby granted to the Government of the United States of America.

This is a division of application Ser. No. 154,698, filed June 18, 1971, now abandoned.

This invention relates to certain new nitrogen containing organic compounds and to a novel process for the preparation of these compounds. More particularly, this invention relates to N,N'-diacyl derivatives of imidazolidine

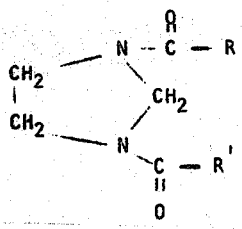

and N,N'-diacyl derivatives of hexahydropyrimidine

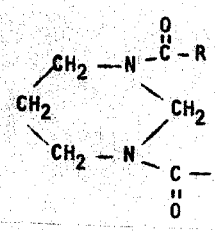

where R and R' in formulas I and II may be the same organic radical or different organic radicals containing from one to about twenty-one carbons, and may be saturated or unsaturated alkyl groups, or addition or substitution products thereof. The substituted imidazolidines and hexahydropyrimidines that are the subject of this invention are characterized by the fact that as growth inhibitors, they are effective against a variety of pathogenic molds.

The findings herein disclosed are considered remarkable in that in some notable instances compounds that are closely related from the point of view of chemical architecture exhibit quite opposite effects against the same organisms. For example, one compound may exhibit properties as a growth inhibitor against one particular organism while a closely related counterpart may serve to promote increased growth for the same organism. Some of these new compounds exhibit broad antimycotic spectrum, whereas others exhibit selective antimycotic spectrum.

The compounds which are the subject of this invention are represented by formulas I and II in which the acyl groups are: acetyl, butyryl, pentanoyl, hexanoyl, heptanoyl, octanoyl, nonanoyl, decanoyl, palmitoyl, stearoyl, and oleoyl.

These new nitrogen-containing compounds were prepared by a novel procedure involving the reaction of a diamide with formaldehyde in the presence of a catalytic amount of a strong acid such as hydrochloric acid. The reaction may be facilitated by use of a solvent such as acetic acid. The reaction may be represented by the following equation:

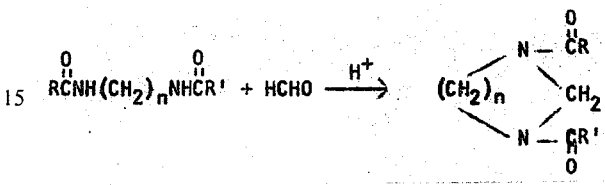

where $n$ is 2 or 3. The reaction is unexpected since when $n$ is 1 or a number greater than 3 no reaction occurs and the diamide may be recovered quantitatively from the reaction mixture by removal of volatile materials.

The bioactivity of these various new nitrogen-containing compounds has been established by us in vitro but, as will be apparent to those skilled in the arts pertaining to the growth inhibition of bacteria, yeast, and molds, the compounds, besides being used as such, will for utilization purposes commonly be formulated using a diluent that can be either liquid, viscous, or solid.

A wide variety of extending agents is operable, the only significant requirement being that the diluent or extender be inert with respect to the compound involved. Petroleum jellies, various alcohols and polyols, vegetable oils and the like are suitable.

Dehydrated mycological agar at pH 7.0 was used to test the inhibition of the test organisms by the compounds being screened. Suspensions of the test organisms were prepared by transferring a loop of spores into sterile saline. Hardened agar plates were inoculated by placing 3 drops of the suspension onto the agar. The micro-organisms were spread over the surface of the plates with sterile glass rods. These plates were employed in the activity estimation against microbial growth. Filter paper discs 6.5 mm in diameter, made from Whatman Number 1 filter paper were used to evaluate the liquid compounds. Stainless steel cylinders 5 mm I.D. were used for the samples which were solids. The paper discs wetted until they were completely saturated with the test compound or stainless steel cylinders containing the test solid compound were placed on the surface of the agar plates inoculated with the test organisms. To eliminate any errors which could result from an insufficient number of tests, a minimum of three experiments, at different times, employing duplicate plates were made for each compound under test. All plates were incubated at the optimum growing temperature for each organisms and readings were taken after 24, 48, 72, and 120 hr periods.

The organisms used in the tests were *Trichophyton rubrum*, *T. violaceum*, *Microsporum gypseum*, and *Aspergillus flavus*. They were obtained from stock cultures. The data from these tests are tabulated in Table I. The physical constants and analytical data for the 1,3-diacyl derivatives of imidazolidine and hexahydropyrimidine used in the tests are tabulated in Table II.

Specific examples showing the preparation of each of the new compounds being claimed are set forth below along with appropriate data in tabular form which is being submitted for the purpose of establishing the growth inhibiting properties of the claimed compounds.

EXAMPLE 1

1,3-Diacetylimidazolidine

Four grams (0.028 mole) of N,N'-ethylenebisacetamide, 4.4 grams (0.053 mole) of a 36.8% formaldehyde solution, 25 ml. of acetic acid, and 0.3 ml of concentrated hydrochloric acid were placed in a flask equipped with stirring bar. The temperature was raised to 50°C with stirring, after which the reaction was continued for two hours. The acetic acid, excess formalin and hydrochloric acid were removed by distillation of reduced pressures. The residue was given two recrystallizations from absolute ethyl alcohol and then dried over phosphorus pentoxide in a vacuum disiccator. The product, 1,3-diacetylimidazolidine, was obtained in 80% yield.

EXAMPLE 2

1,3-Dibutyrylimidazolidine

This compound was prepared by the procedure of Example 1 from 3 grams (0.015 mole) of N,N'-ethylenebisbutyramide, 2.7 grams (0.032 mole) of a 36.8% formaldehyde solution, 25 ml of acetic acid and 0.3 ml of concentrated hydrochloric acid. The product, 1,3-dibutyrylimidazolidine was obtained in 78% yield.

EXAMPLE 3

1,3-Dipentanoylimidazolidine

This compound was prepared by the procedure of Example 1 from 4 grams (0.018 mole) of N,N'-ethylenebispentanamide, 3.2 grams (0.039 mole) of a 36.8% formaldehyde solution, and 0.3 ml of concentrated hydrochloric acid. The product, 1,3-dipentanoylimidazolidine, was obtained in 90% yield.

EXAMPLE 4

1,3-Dihexanoylimidazolidine

Three grams (0.012 mole) of N,N'-ethylenebishexanamide, 2.1 grams (0.026 mole) of a 36.8% formaldehyde solution, 25 ml of acetic acid and 0.3 ml of concentrated hydrochloric acid were placed in a flask equipped with stirring bar. The temperature was raised to 50°C with stirring, after which the reaction was continued for two hours. After the addition of cold water, the white precipitate that formed was removed by filtration, employing a Buchner funnel, washed with water, recrystallized twice from absolute ethyl alcohol and dried in a vacuum desiccator over phosphorous pentoxide. The product, 1,3-dihexanoylimidazolidine, was obtained in 90% yield.

EXAMPLE 5

1,3-Diheptanoylimidazolidine

This compound was prepared by the procedure of Example 4 from 4 grams (0.014 mole) of N,N'-ethylenebisheptanamide, 1.5 grams (0.018 mole) of a 36.8% formaldehyde solution, 25 ml of acetic acid and 0.3 ml of concentrated hydrochloric acid. The product, 1,3-diheptanoylimidazolidine was obtained in 90% yield.

EXAMPLE 6

1,3-Dioctanoylimidazolidine

This compound was prepared by the procedure of Example 4 from 4 grams (0.013 mole) of N,N'-ethylenebisoctanamide, 2.3 grams (0.028 mole) of a 36.8% formaldehyde solution, 25 ml of acetic acid, and 0.3 ml of concentrated hydrochloric acid. The product, 1,3-dioctanoylimidazolidine, was obtained in 90% yield.

EXAMPLE 7

1,3-Dinonanoylimidazolidine

This compound was prepared by the procedure of Example 4 from 4 grams (0.012 mole) of N,N'-ethylenebisnonanamide, 1.3 grams (0.016 mole) of a 36.8% formaldehyde solution, 25 ml of acetic acid, and 0.3 ml of concentrated hydrochloric acid. The product, 1,3-dinonanoylimidazolidine, was obtained in 90% yield.

EXAMPLE 8

1,3-Didecanoylimidazolidine

This compound was prepared by the procedure of Example 4 from 4 grams (0.011 mole) of N,N'-ethylenebisdecanamide, 2 grams (0.025 mole) of a 36.8% formaldehyde solution, 25 ml of acetic acid and 0.3 ml of concentrated hydrochloric acid. The product, 1,3-didecanoylimidazolidine, was obtained in 90% yield.

EXAMPLE 9

1,3-Dipalmitoylimidazolidine

This compound was prepared by the procedure of Example 4 from 3.2 grams (0.006 mole) of N,N'-ethylenebispalmitamide, 1.1 grams (0.013 mole) of a 36.8% formaldehyde solution, 25 ml of acetic acid and 0.3 ml of concentrated hydrochloric acid. The product, 1,3-dipalmitoylimidazolidine, was obtained in 89% yield.

EXAMPLE 10

1,3-Distearoylimidazolidine

This compound was prepared by the procedure of Example 4 from 4 grams (0.007 mole) of N,N'-ethylenebisstearamide, 1.2 grams (0.014 mole) of a 36.8% formaldehyde solution, 25 ml of acetic acid and 0.3 ml of concentrated hydrochloric acid. The product, 1,3-distearoylimidazolidine, was obtained in 90% yield.

EXAMPLE 11

1,3-Dioleoylimidazolidine

This compound was prepared by the procedure of Example 4 from 3 grams (0.005 mole) of N,N'-ethylenebisoleamide, 1.1 grams (0.013 mole) of a 36.8% formaldehyde solution, 25 ml of acetic acid and 0.3 ml of concentrated hydrochloric acid. The product, 1,3-dioleoylimidazolidine, was obtained in 90% yield.

EXAMPLE 12

1,3-Diacetylhexahydropyrimidine

Four grams (0.025 mole) of N,N'-propylenebisacetamide, 4.5 grams (0.055 mole) of 36.8% formaldehyde solution, 25 ml of acetic acid, and 0.3 ml of concentrated hydrochloric acid were placed in a flask equipped with stirring bar. The temperature was raised to 50°C with stirring, after which the reaction was continued for two hours. The acetic acid, excess formalin and hydrochloric acid were removed by distillation at reduced pressure. The product, 1,3-diacetylhexahydropyrimidine, was obtained in quantitative yield.

EXAMPLE 13

1,3-Dibutyrylhexahydropyrimidine

This compound was prepared by the procedure of Example 12 from 4 grams (0.019 mole) of N,N'-propylenebisbutyramide, 3.4 grams (0.042 mole) of a 36.8% formaldehyde solution, 25 ml of acetic acid, and 0.3 ml of concentrated hydrochloric acid. The product, 1,3-dibutyrylhexahydropyrimidine, was obtained in quantitative yield.

EXAMPLE 14

1,3-Dipentanoylhexahydropyrimidine

Four grams (0.017 mole) of N,N'-propylenebispentanamide, 3 grams (0.037 mole) of a 36.8% formaldehyde solution, 25 ml of acetic acid and 0.3 ml of concentrated hydrochloric acid were placed in a flask equipped with stirring bar. The temperature was raised to 50°C with stirring, after which the reaction was continued for two hours. The mixture was cooled, diluted with cold water, extracted with diethyl ether, washed with water and dried over anhydrous sodium sulfate. After filtration, the solvent was removed by stripping under reduced pressure, leaving the liquid product, 1,3-dipentanoylhexahydropyrimidine, in 90% yield.

EXAMPLE 15

1,3-Dihexanoylhexahydropyrimidine

Three grams (0.011 mole) of N,N'-propylenebishexanamide, 1.5 grams (0.018 mole) of a 36.8% formaldehyde solution, 25 ml of acetic acid and 0.3 ml of concentrated hydrochloric acid were placed in a flask equipped with stirring bar. The temperature was raised to 50°C and the reaction was continued for two hours. The mixture was cooled, diluted with cold water, extracted with benzene, washed with water and dried over anhydrous sodium sulfate. After filtration, the solvent was removed by stripping under reduced pressure, leaving the product, 1,3-dihexanoylhexahydropyrimidine, in 94% yield.

EXAMPLE 16

1,3-Diheptanoylhexahydropyrimidine

This compound was prepared by the procedure of Example 15 from 4 grams (0.013 mole) of N,N'-propylenebisheptanamide, 2.4 grams (0.029 mole) of a 36.8%k formaldehyde solution, 25 ml of acetic acid and 0.3 ml of concentrated hydrochloric acid. The product, 1,3-diheptanoylhexahydropyrimidine, was obtained in 84% yield.

EXAMPLE 17

1,3-Dioctanoylhexahyropyrimidine

This compound was prepared by the procedure of Example 15 from 4 grams (0.012 mole) of N,N'-propylenebisoctanamide, 2.6 grams (0.031 mole) of a 36.8% formaldehyde solution, 25 ml of acetic acid and 0.3 ml of concentrated hydrochloric acid. The product, 1,3-dioctanoylhexahydropyrimidine, was obtained in 90% yield.

EXAMPLE 18

1,3-Dinonanoylhexahydropyrimidine

This compound was prepared by the procedure of Example 15 from 4 grams (0.011 mole) of N,N'-propylenebisnonanamide, 2 grams (0.024 mole) of a 36.8% formaldehyde solution, 25 ml of acetic acid and 0.3 ml of concentrated hydrochloric acid. The product, 1,3-dinonanoylhexahydropyrimidine, was obtained in 92% yield.

EXAMPLE 19

1,3-Didecanoylhexahydropyrimidine

This compound was prepared by the procedure of Example 15 from 4 grams (0.011 mole) of N,N'-propylenebisdecanamide, 2 grams (0.024 mole) of a 36.8% formaldehyde solution, 25 ml of acetic acid and 0.3 ml of concentrated hydrochloric acid. The product, 1,3-didecanoylhexahydropyrimidine, was obtained in 90% yield.

EXAMPLE 20

1,3-Dipalmitoylhexahydropyrimidine

Three grams (0.005 mole) of N,N'-propylenebispalmitamide, 1.5 grams (0.018 mole) of a 36.8% formaldehyde solution, 25 ml of acetic acid and 0.3 ml of concentrated hydrochloric acid were placed in a flask equipped with stirring bar. The temperature was raised to 50°C with stirring after which the reaction was continued for two hours. After the addition of cold water, the white precipitate that formed was removed by filtration employing a Buchner funnel, washed with water, recrystallized from methyl alcohol and dried in a vacuum desiccator over phosphorous pentoxide. The product, 1,3-dipalmitoylhexahydropyrimidine, was obtained in 90% yield.

EXAMPLE 21

1,3-Distearoylhexahydropyrimidine

This compound was prepared by the procedure of Example 20 from 3 grams (0.005 mole) of N,N'-propylenebisstearamide, 1 grams (0.012 mole) of a 36.8% formaldehyde solution, 25 ml of acetic acid and 0.3 ml concentrated hydrochloric acid. The product, 1,3-distearoylhexahydropyrimidine, was obtained in 90% yield.

EXAMPLE 22

1,3-Dioleoylhexahydropyrimidine

This compound was prepared by the procedure of Example 15 from 4 grams (0.007 mole) of N,N'-propylenebisoleamide, 1.2 grams (0.015 mole) of a 36.8% formaldehyde solution, 25 ml of acetic acid and 0.3 ml of concentrated hydrochloric acid. The product, 1,3-dioleoylhexahydropyrimidine, was obtained in 88% yield.

EXAMPLE 23

N-(9,10-epithiooctodecanoyl)morpholine 139 g (0.37 mole) of N-(9,10-epoxystearoyl)morpholine was added dropwise at room temperature to a well stirred solution suspension containing 74 g (0.97 mole) thiourea and 123 g (1.01 moles) benzoic acid in 1 liter of acetone. Stirring was continued for three hours beyond addition of the epoxide. The reaction mixture was then treated with 69 g (0.65 moles) of $Na_2CO_3$ as a 10% aqueous solution and the organic phase extracted with hexane, washed, dried and stripped. The elemental analysis was found to be C 69.70%, H 10.95%, N 4.26%, S 7.28%. Theoretical values are C 69.34%, H 10.77%, N 3.68%, S 7.80%.

TABLE I

Antimycotic Activity of 1,3-Diacyl Derivatives of Imidazolidine and Hexahydropyrimidine

| Sample No. | Compound | Antimicrobial Activity[1] Micro-organism[2] | | | | | | |
|---|---|---|---|---|---|---|---|---|
| | | A | B | C | D | E | F | G |
| 1 | 1,3-Diacetylimidazolidine | — | — | — | — | | | |
| 2 | 1,3-Dibutyrylimidazolidine | xx | ++ | x | + | | | |
| 3 | 1,3-Dipentanoylimidazolidine | — | — | — | — | | | |
| 4 | 1,3-Dihexanoylimidazolidine | ++ | ++ | ++ | ++ | | | |
| 5 | 1,3-Diheptanoylimidazolidine | — | xx | x | — | | | |
| 6 | 1,3-Dioctanoylimidazolidine | — | + | — | — | | | |
| 7 | 1,3-Dinonanoylimidazolidine | ++ | x | x | + | | | |
| 8 | 1,3-Didecanoylimidazolidine | xx | x | x | x | | | |
| 9 | 1,3-Dipalmitoylimidazolidine | — | — | xx | — | | | |
| 10 | 1,3-Distearoylimidazolidine | xx | x | x | xx | | | |
| 11 | 1,3-Dioleoylimidazolidine | xx | — | x | xx | | | |
| 12 | 1,3-Diacetylhexahydropyrimidine | ++ | — | — | — | | | |
| 13 | 1,3-Dibutyrylhexahydropyrimidine | ++ | — | — | — | | | |
| 14 | 1,3-Dipentanoylhexahydropyrimidine | ++ | ++ | ++ | ++ | | | |
| 15 | 1,3-Dihexanoylhexahydropyrimidine | ++ | ++ | ++ | ++ | | | |
| 16 | 1,3-Diheptanoylhexahydropyrimidine | ++ | ++ | + | ++ | | | |
| 17 | 1,3-Dioctanoylhexahydropyrimidine | ++ | ++ | + | ++ | | | |
| 18 | 1,3-Dinonanoylhexahydropyrimidine | + | xx | x | xx | | | |
| 19 | 1,3-Didecanoylhexahydropyrimidine | xx | x | x | x | | | |
| 20 | 1,3-Dipalmitoylhexahydropyrimidine | x | x | x | xx | | | |
| 21 | 1,3-Distearoylhexahydropyrimidine | — | — | — | — | | | |
| 22 | 1,3-Dioleoylhexahydropyrimidine | — | — | — | + | | | |
| 23 | N-(9,10-Epithiooctodecanoyl)morpholine | | | x | + | xx | ++ | xx |

[1] ++ = The zone of inhibition was at least 0.5 cm beyond disc or cylinder area at 120 hrs.
+ = The zone of inhibition was less than 0.5 cm beyond disc or cylinder area at 120 hrs.
xx = Organism failed to grow on disc or cylinder area at 120 hrs.
x = Slight growth on the saturated disc or cylinder area at 120 hrs.
— = No inhibition detectable
[2] A = *Trichophyton rubrum*.
B = *Microsporum gypseum*.
C = *Aspergillus flavus*.
D = *Trichophyton violaceum*.
E = *Candida albicans*.
F = *Bacillus species*.
G = *Pseudomonas species*.

TABLE II

Elemental Analyses and Properties of 1,3-Diacyl Derivatives of Imidazolidine and Hexahydropyrimidine

| | Yield % | Density 30 C | $N_D^{30}$ | mp C[1] | % C | | % H | | % N | |
|---|---|---|---|---|---|---|---|---|---|---|
| | | | | | Exp. | Theory | Exp. | Theory | Exp. | Theory |
| 1,3-Diacetylimidazolidine | 80 | | | 90–92 | 53.73 | 53.83 | 7.77 | 7.75 | 17.91 | 17.94 |
| 1,3-Dibutyrylimdazolidine | 78 | | | 84–86 | 62.35 | 62.23 | 9.77 | 9.50 | 13.10 | 13.20 |
| 1,3-Dipentanoylimidazolidine | 90 | | | 89–91 | 65.61 | 64.95 | 10.13 | 10.06 | 11.75 | 11.66 |
| 1,3-Dihexanoylimidazolidine | 90 | | | 91–93 | 67.25 | 67.13 | 10.54 | 10.52 | 10.47 | 10.44 |
| 1,3-Diheptanoylimidazolidine | 90 | | | 92–94 | 69.33 | 68.87 | 10.97 | 10.88 | 9.38 | 9.45 |
| 1,3-Dioctanoylimidazolidine | 90 | | | 93–95 | 70.14 | 70.31 | 11.25 | 11.18 | 8.63 | 8.63 |
| 1,3-Dinonanoylimidazolidine | 90 | | | 97–99 | 71.92 | 71.55 | 11.55 | 11.44 | 7.73 | 7.94 |
| 1,3-Didecanoylimidazolidine | 90 | | | 100–102 | 72.52 | 72.59 | 11.67 | 11.65 | 7.25 | 7.36 |
| 1,3-Dipalmitoylimidazolidine | 89 | | | 108–110 | 76.85 | 76.30 | 12.50 | 12.44 | 5.04 | 5.09 |
| 1,3-Distearoylimidazolidine | 90 | | | 108–110 | 77.85 | 77.41 | 12.79 | 12.66 | 4.75 | 4.63 |
| 1,3-Dioleoylimidazolidine | 90 | | | 50–52 | 77.43 | 77.87 | 12.01 | 12.41 | 4.66 | 4.66 |
| 1,3-Diacetylhexahydropyrimidine | [2] | 1.1378 | 1.4911 | | 56.21 | 56.48 | 8.44 | 8.35 | 16.44 | 16.47 |
| 1,3-Dibutyrylhexahydropyrimidine | [2] | 1.0454 | 1.4847 | | 63.66 | 63.71 | 9.93 | 9.80 | 12.47 | 12.38 |
| 1,3-Dipentanoylhexahydropyrimidine | 90 | 1.0244 | 1.4814 | | 65.50 | 66.11 | 10.31 | 10.31 | 10.81 | 11.02 |
| 1,3-Dihexanoylhexahydropyrimidine | 94 | 0.9779 | 1.4797 | | 67.92 | 68.06 | 10.77 | 10.71 | 9.96 | 9.92 |
| 1,3-Diheptanoylhexahydropyrimidine | 84 | 0.9843 | 1.4768 | | 68.88 | 69.64 | 10.96 | 11.04 | 8.97 | 9.02 |
| 1,3-Dioctanoylhexahydropyrimidine | 90 | 0.9673 | 1.4774 | | 70.59 | 70.96 | 11.35 | 11.32 | 8.34 | 8.28 |
| 1,3-Dinonanoylhexahydropyrimidine | 92 | 0.9576 | 1.4760 | | 71.57 | 72.08 | 11.33 | 11.55 | 7.72 | 7.64 |
| 1,3-Didecanoylhexahydropyrimidine | 90 | | | 28–30 | 73.27 | 73.06 | 11.91 | 11.75 | 7.14 | 7.10 |
| 1,3-Dipalmitoylhexahydropyrimidine | 90 | | | 64–66 | 76.65 | 76.81 | 12.58 | 12.54 | 4.90 | 4.98 |
| 1,3-Distearoylhexahydropyrimidine | 90 | | | 66–68 | 78.05 | 77.73 | 13.36 | 12.72 | 4.37 | 4.53 |
| 1,3-Dioleoylhexahydropyrimidine | 88 | 0.9183 | | | 77.75 | 77.98 | 11.95 | 12.44 | 4.54 | 4.55 |

[1] Uncorrected.
[2] The yield was quantitative.

We claim:
1. A process for preparing a compound represented by the formula

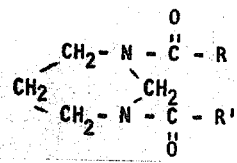

where R and R' are monovalent organic radicals, which process comprises reacting N,N'-propylenebisamide with formaldehyde in the presence of a strong acid catalyst.

2. The process of claim 1 wherein acetic acid is used as a solvent, hydrochloric acid is the catalyst, and the reaction is carried out at a temperature from ambient to about 100°C.

* * * * *